Patented Apr. 17, 1945

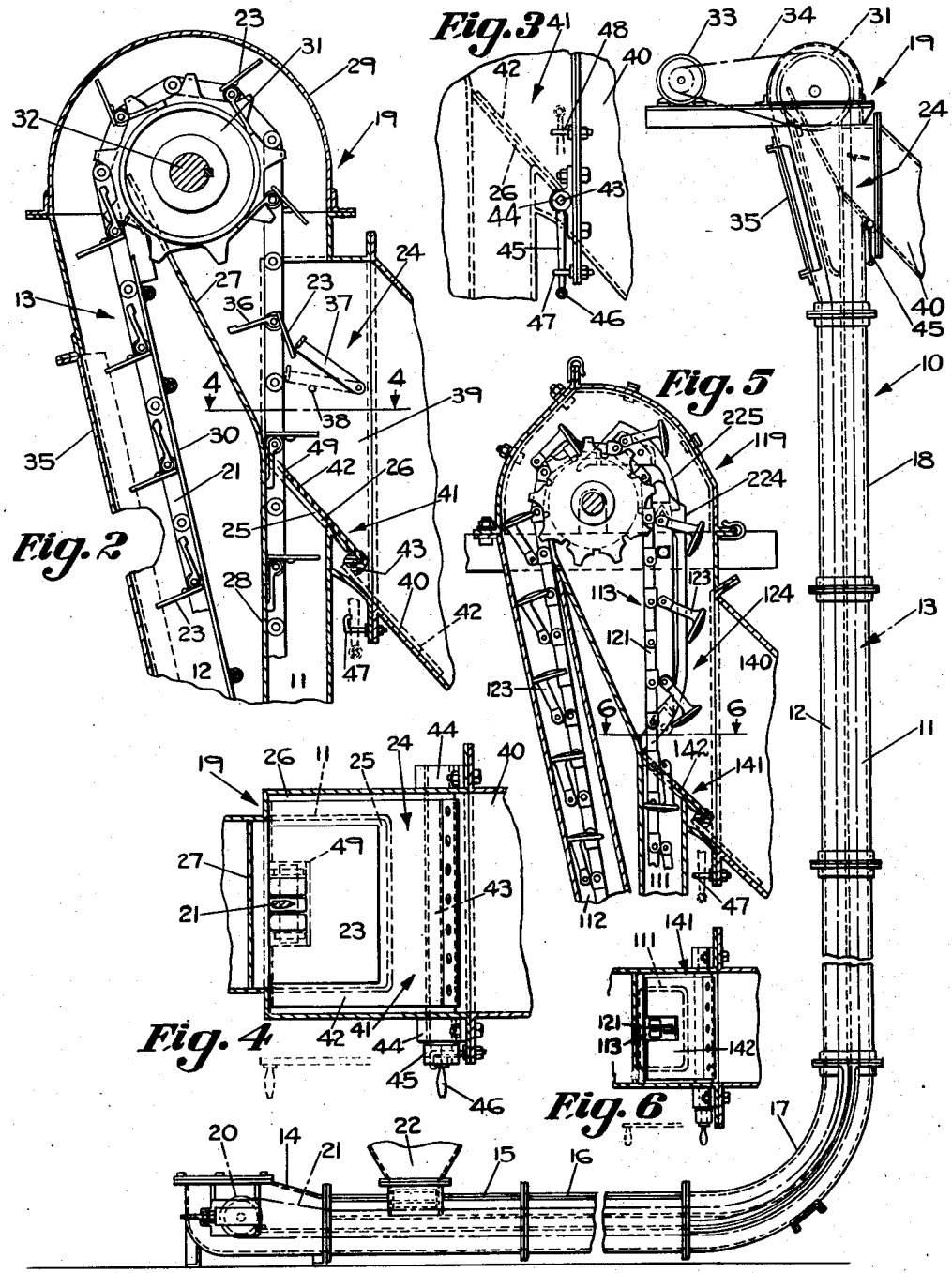

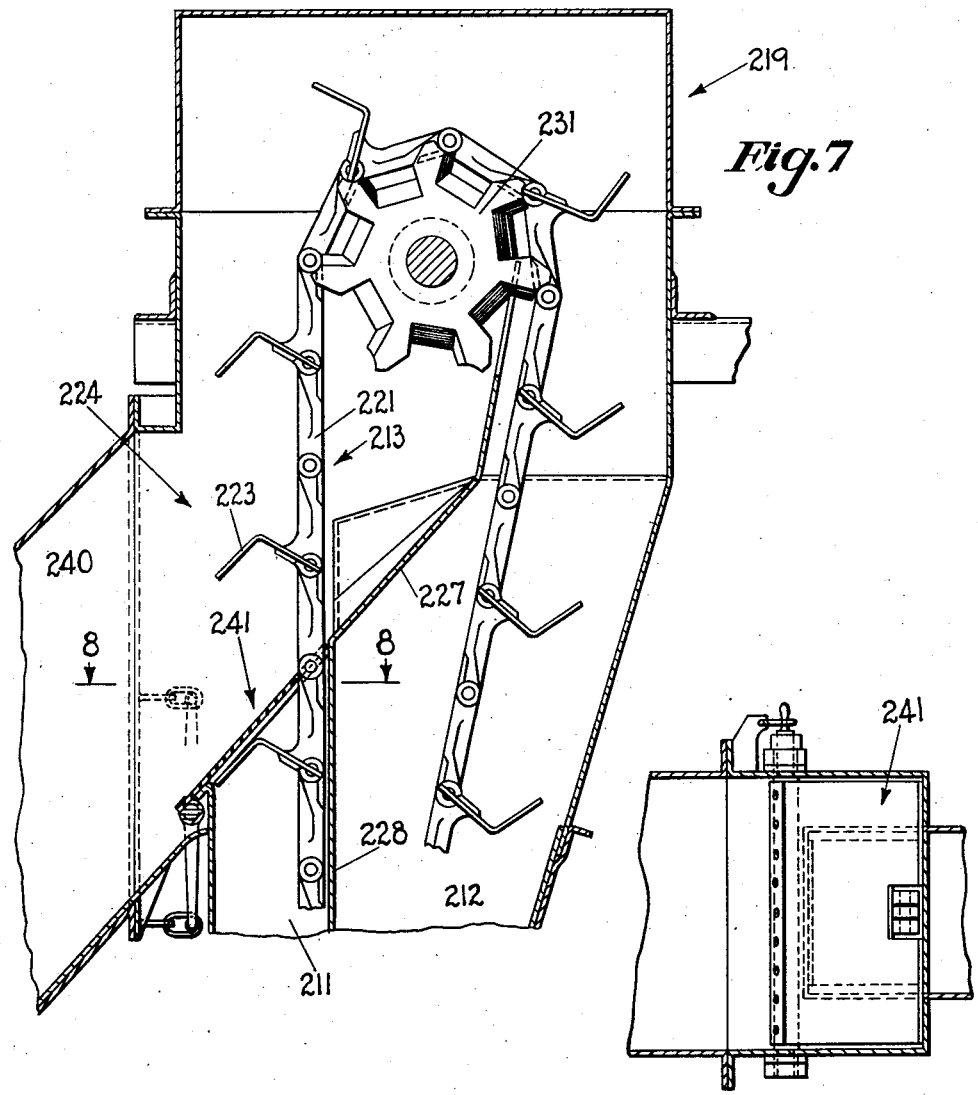

2,373,765

UNITED STATES PATENT OFFICE 2,373,765

CONVEYER

Alexis W. Lemmon, Upper Arlington, Ohio, assignor to The Jeffrey Manufacturing Company, a corporation of Ohio Application August 15, 1942, Serial No. 454,914

9 Claims. (Cl. 198—65)

This invention relates to a conveyer and particularly to mechanism to insure the complete cleaning out of material from the upwardly extending working leg of a scraper type conveyer.

An object of the invention, therefore, is to provide simple and improved means to insure a thorough removal of all material from an upwardly extending working leg of a scraper conveyer when it is desired to clean out said working leg.

Other objects of the invention will appear hereinafter, the novel features and combinations being set forth in the appended claims.

In the accompanying drawings,

Fig. 1 is a side elevational view of a conveyer comprising my invention;

Fig. 2 is a vertical sectional view through the head section of the conveyer of Fig. 1;

Fig. 3 is an enlarged detailed view showing the operating mechanism for the clean out device;

Fig. 4 is a sectional view taken on the line 4—4 of Fig. 2 looking in the direction of the arrows;

Fig. 5 is a sectional view of a head section of a modified form of conveyer;

Fig. 6 is a sectional view taken on the line 6—6 of Fig. 5 looking in the direction of the arrows;

Fig. 7 is a sectional view of a head section of another modified form of conveyer; and Fig. 8 is a sectional view taken on the line 8—8 of Fig. 7 looking in the direction of the arrows.

This invention relates to a conveyer which in many general respects follows that disclosed in my application, Serial No. 329,136, filed April 11, 1940, entitled Conveyer, and it is to be understood that unless a contrary fact is indicated, the structure therein disclosed, particularly that illustrated in Figs. 1 and 2 of the drawings, follows the disclosure of said application.

Referring particularly to Fig. 1 of the drawings, there is disclosed a conveyer including a housing or casing 10 which is formed of a plurality of interconnected sections which cooperate to provide an enclosing working leg 11 and a return leg 12 through which endless conveyer mechanism 13 extends. The housing or casing 10 includes a foot or tail section 14, a feed section 15, one or more intermediate horizontal sections 16, a curved section 17, one or more upright sections 18 and head section 19. The several sections 14 to 19, inclusive, are removably attached together and cooperate to provide the complete housing or casing 10 with the aforementioned working leg 11 effectively starting with the feed section 15 and terminating in the head section 19, said working leg forming from the inlet to the outlet thereof a continuous substantially totally enclosed passageway through which material is scraped and conveyed by the conveyer mechanism 13 as hereinafter described more completely. The return leg provides a somewhat similar housing for the return run of the conveyer mechanism 13 for each of the successive sections.

The tail section 14 includes an adjustable sprocket 20 about which an endless conveyer chain or draft means 21 of the conveyer mechanism 13 extends and by which the tension thereof is adjusted. The feed section 15 includes a feed hopper 22 by which material is fed either into the return leg 12 or into the working leg 11. If the material is fed into the return leg 12 it will be conveyed rearwardly by the endless conveyer mechanism 13 until it falls into the path of the working run of said conveyer mechanism 13 and is conveyed into the working leg 11 in a manner which is well understood in this art. It is, of course, to be understood that the housing or casing 10 may have a wide variety of configurations different from that illustrated and described.

In addition to the endless chain 21 the conveyer mechanism 13 includes a plurality of pivoted flights 23 which, when traveling through the working leg, convey the material by scraping action, the material being confined to said flights by the totally enclosing housing forming said working leg 11, as illustrated best in Fig. 2 of the drawings.

The head section 19 includes both working and return legs 11 and 12 and the working leg is in direct communication with a discharge chamber 24, the communication being through an opening 25 and an inclined chute plate 26, forming a portion of the bottom of said discharge chamber 24, said discharge chamber 24 having a greater width than the working leg 11 or the remainder of the head section 19, as best illustrated in Fig. 4 of the drawings.

Forming as an effectual continuation of the chute plate 26 is a rearwardly and upwardly sloping plate 27 which also in effect forms a continuation of a partition 28 which divides the head section 19 into working and return legs 11 and 12, respectively. It may be stated that a similar partition divides each of the sections 17 and 18 into similar working and return legs. There is preferably a double partition dividing the casings of sections 15 and 16 and the lower part of sections 17, in a manner well understood in this art.

It may further be pointed out that the head section 19 includes a removable top cover plate 29 and has a supporting bar or plate 30 for guiding and supporting the return run of the chain 21. Said chain 21 is supported on and driven by a head or drive sprocket 31 within the head section 19 which is mounted upon the drive shaft 32 driven from an electric motor 33 by chain and sprocket mechanism 34. A removable access door 35 is also provided for the return leg of said head section 19.

With reference particularly to Fig. 2 of the drawings, it is obvious that as the pivoted flights 23 move into the discharge chamber 24 they will pivot to discharge position by virtue of the fact that their integrally formed guide legs 36 act under the influence of the chute plate 27 to permit their swinging to a discharge position with their forward edges downward. More complete cleaning of material from said flights 23 is provided by virtue of pivoted wiper mechanism 37 which wipes the face of each flight 23 as it passes through the discharge chamber 24. Wiper mechanism 37 is provided with limiting stop means 38 to restrict counter-clockwise swinging movement thereof. Since the discharge chamber mechanism 24 is wider than the casing 10 the material will flow laterally over the side edges as well as over the front edges of the flights into the discharge chamber, and may even flow rearwardly onto the plate 27. In any event, however, the material will flow over the chute plate 26 and through the discharge opening 39 at one side of the discharge chamber 24, there preferably being a discharge chute 40 connected with said discharge chamber 24 and positioned to receive the material which discharges through the opening 39.

In practice it has been found that when it is desired to clean out the working leg 11, or in other words, to remove the final portion of the material which is being conveyed from the feed hopper 22 to the chute 40, difficulty is encountered in removing the last small portion of the material and consequently there is a tendency for some small amount of material to be left in the conveyer. This is undesirable under various conditions so I provide mechanism to insure a very efficient removal of all the material. This mechanism includes a clean out device 41 comprising a clean out plate 42 which is preferably in the form of a flexible plate and may be made, for example, of flexible belting material formed of rubber reinforced with fabric, though it is to be understood that said plate 42 may be made of other material such as flexible metal or heavy paper or cardboard with or without reinforcing impregnation. Said plate 42 is rigidly attached to a flat surface of a cross rod 43 which is pivotally attached at opposite ends to bearing boxes 44 rigidly attached to an integral flange formed on the side plates of the discharge chamber 24 of head section 19. The cross rod 43 is provided with an operating lever 45 having thereon a handle 46, said lever 45 being adjustable into the two positions as illustrated particularly in Fig. 3 of the drawings. Latch means 47 and 48 are provided to latch the lever 45 in its two positions of adjustment.

When the lever 45 is in the full line position as illustrated in Fig. 3 of the drawings the clean out palte 42 will rest on top of the chute plate 26 as illustrated best in Figs. 2, 3 and 4 of the drawings. This is the position of the parts when it is desired to remove the last portion of the material being conveyed.

It is to be noted that the plate 42 is provided with a notch 49 which permits the conveyer chain 21 to pass freely therethrough without bending or deflecting said plate 42. It is obvious, however, as each flight 23 moves through the opening 25 in chute plate 26 its forward or outer edge will come in contact with the bottom of said plate 42 and swing it by bending it to permit said flight 23 to move upwardly into the discharge chamber 24 and after a predetermined movement the upper edge of the plate 42 will move past the forward edge of the flight 23 and said plate 42 will swing downwardly into contact with said chute plate 26 which is the position illustrated in Fig. 2 of the drawings. It will be noted that this position is reached before the flight 23 has started to tip or pivot and it is also to be noted that when the parts are in this position said clean out plate 42 is between one flight 23 which is in the working leg 11 and the next adjacent upper flight which is within the discharge chamber 24 and this general condition will exist until the flight, which is illustrated directly below the plate 42, comes in contact with it to repeat the above described action.

However, during the time that said plate 42 is between the two flights as above described and as ilustrated in Fig. 2 of the drawings, material will be discharged from the flight 23 within the chamber 24 and as said flight 23 which is within said chamber 24 discharges its material, said material cannot fall through the opening 25 and back into the working leg 11 because of said clean out plate 42. As a consequence, the clean out plate 42 will be effective to insure a substantially total removal of all the granular material during a clean out operation.

In normal practice it would be undesirable to have clean out plate 42 in the operating position as illustrated in Figs. 2, 3 and 4 of the drawings, and it is not necessary for efficient discharge as material from any discharging flight flows over the material supported by the following flight through the discharge opening. Furthermore, to leave it in this position would merely result in additional friction and wear to no useful end, consequently I have provided means to swing plate 42 to an inoperative position except when it is doing useful work or, in other words, serving a useful purpose.

This removal of the plate 42 to inoperative position is accomplished by swinging the lever 45 from the full line position illustrated in Fig. 3 of the drawings to the dotted line position illustrated in said Fig. 3 where it is retained by the latch mechanism 48. In this position the plate 42 rests upon the bottom of the discharge chamber 24 and the discharge chute 40, as clearly illustrated in dotted lines in Fig. 2 of the drawings.

In Figs. 5 and 6 of the drawings I have illustrated a modified type of conveyer mechanism and associated apparatus which has required some modification of the clean out devices, which I shall now describe.

The housing 10 has not been essentially changed but the head section 119 thereof has been modified in certain respects as is evident in Fig. 5 of the drawings. Said head section 119 includes a discharge chamber 124 which has a discharge opening leading to discharge chute 140. A working leg 111 communicates with said discharge chamber 124 by way of a communicating opening and a clean out device 141 is provided which is similar in all essential respects to the clean out device 41. It may be noted, however, that said clean out device 141 has a larger notch to accommodate different conveyer mechanism 113 which includes an endless conveyer chain 121 and trailing type pivoted flights 123 which are moved to discharge position by successive cams 224 and 225.

It may be stated that except for the presence of the clean out device 141 the structure of the conveyer, the head section of which is shown in detail in Figs. 5 and 6 of the drawings, preferably follows the structure of the conveyer disclosed in the application of Stanley M. Mercier, Ser. No. 448,395, filed June 24, 1942, entitled conveyer.

In Figs. 7 and 8 of the drawings I have illustrated another modified type of conveyer and associated apparatus which I shall now describe. The housing 10 preserves its original structure but the head section 219 thereof has been modified in certain respects as is evident by reference to Fig. 7 of the drawings. Said head section 219 includes the discharge chamber 224 which has a discharge opening leading to discharge chute 240. A working leg 211 communicates with said discharge chamber 224 by way of a communicating opening and a clean out device 241 is provided which is similar in all essential respects to the clean out devices 41 and 141 above described. The conveyer mechanism 213 differs from conveyer mechanisms 13 and 113 above described particularly in that the flights 223 are rigidly attached to alternate links of the chain 221 and are of the solid, as distinguished from the skeleton, structure and are preferably peaked caped. It is, of course, obvious that said flights 223 may also be of skeleton form, if desired.

It may be further pointed out that the head section 219 also includes a return leg 212 which is separated from the working leg 211 by a common partition 228. It is also evident that most of the material will flow from the flights 223 onto a discharge chute 227 and through the chamber 224 to chute 240. Some of it may be carried over the head sprocket 231 and discharged onto said chute 227. The endless conveyer mechanism 213 of this form of conveyer obviously performs in the same way as the endless conveyer mechanisms 13 and 113 above described.

In the operation of the device in accordance with any modification, during normal operation the clean out device 41, 141 or 241 will be swung to an inoperative position wherein the clean out plate 42 or its equivalent device 142 or 242 will be swung downwardly into the chute 40, 140 or 240. Under these conditions the conveyer will operate as though the clean out device were not even present so that material fed into or delivered to the working leg 11, 111, or 211 will be conveyed upwardly to the discharge chamber 24 or 124 where it will be discharged by way of chute 40 or 140. When it is desired to remove the material from the conveyor no further material will be fed into the hopper 22 and the clean out device 41, 141 or 241 will be swung to its operative position as illustrated in Figs. 2, 3 and 4 or Figs. 5 and 6 or Figs. 7 and 8 of the drawings. Under these conditions the clean out plate of said clean out device will cover the opening between the working leg and the discharge chamber except when it is moved therefrom by a flight traveling from said working leg into said discharge chamber. When said clean out plate is in its working position, particularly between two successive flights, one of which is discharging material within the discharge chamber, the other being in whole or in part within the working leg, said clean out device will operate so that after a few runs following the emptying of hopper 22 substantially all of the material will be removed from the conveyer by way of chute 40, 140 or 240.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a conveyer, the combination with an enclosing casing having an upwardly extending working leg with a discharge opening, of conveyer means having spaced flights adapted to convey material through said working leg to said discharge opening, and a clean out plate adjacent said discharge opening constructed and arranged to take a position between successive flights and substantially to close said working leg adjacent said discharge opening, the upper of said flights between which said clean out plate is positioned being pivoted to a material discharging position, whereby material falling from the discharging flight will be guided to said discharge opening.

2. In a conveyer, the combination with an enclosing casing having an upwardly extending working leg with a discharge opening, of conveyer means having spaced flights adapted to convey material through said working leg to said discharge opening, and a clean out plate adjacent said discharge opening constructed and arranged to take a position between successive flights and substantially to close said working leg adjacent said discharge opening, the upper of said flights between which said clean out plate is positioned being in a material discharging position, whereby material falling from the discharging flight will be guided to said discharge opening.

3. Conveyer apparatus including a housing constructed to provide an upwardly extending working leg opening into a discharge compartment having a material discharge opening, conveyer mechanism for conveying material through said leg and into said discharge compartment for discharging through said discharge opening, and a clean out plate adapted to extend over the opening from said working leg into said discharge chamber and positioned to guide material to said discharge opening.

4. Conveyer apparatus including a housing constructed to provide an upwardly extending working leg opening into a discharge compartment having a material discharge opening, conveyer mechanism for conveying material through said leg and into said discharge compartment for discharging through said discharge opening, a clean out plate adapted to extend over the opening from said working leg into said discharge chamber and positioned to guide material to said discharge opening, and means for moving said clean out plate to operative or inoperative positions.

5. A discharge section for a conveyer including a housing having a material discharge chamber, a working leg through which a conveyer is adapted to travel leading to and communicating with said chamber by way of an opening, said discharge chamber having a material discharge opening, and a flexible clean out plate extending over at least part of said opening between said working leg and said discharge chamber.

6. A head section for a scraper conveyer including an upwardly extending working leg leading to a discharge chamber and being in communication therewith by an opening, and a clean out plate formed of flexible material extending substantially over said opening.

7. A head section for a conveyer including a material discharge chamber having a material discharge opening at one side thereof, a rearwardly sloping plate at the back of said discharge chamber, a working leg leading to said chamber and communicating therewith by way of an opening in the bottom thereof, and a clean out plate extending over said opening and sloping along the same general slope as said rearwardly sloping plate and adapted to direct material to a discharge opening in one side of said discharge chamber.

8. A conveyer including a casing providing an upwardly extending working leg terminating in a material discharge chamber through an opening, a discharge chute on said chamber, conveyer mechanism extending through said working leg and discharge chamber, means comprising a clean out plate adapted to be selectively positioned over said opening while providing for passage of the conveyer mechanism therethrough and while catching material discharged therefrom and delivering it to said chute or within said chute out of the path of travel of said conveyer mechanism, and means for selectively positioning said clean out plate in said two positions.

9. A conveyer including a casing providing an upwardly extending working leg terminating in a material discharge chamber through an opening, a discharge chute on said chamber, conveyer mechanism extending through said working leg and discharge chamber, means comprising a clean out plate formed of flexible material adapted to be selectively positioned over said opening while providing for passage of the conveyer mechanism therethrough and while catching material discharged therefrom and delivering it to said chute or within said chute out of the path of travel of said conveyer mechanism, and means for selectively positioning said clean out plate in said two positions, said clean out plate having a slot therein through which draft means of said conveyer mechanism extends.

ALEXIS W. LEMMON.